Patented Dec. 30, 1941

2,268,144

UNITED STATES PATENT OFFICE 2,268,144

RECOVERING PIGMENTS

Vincent C. Vesce, Ridgewood, N. J., assignor to Harmon Color Works, Inc., Haledon, N. J., a corporation of New York No Drawing. Application March 28, 1940, Serial No. 326,502

8 Claims. (Cl. 106—309)

This invention relates to recovering pigments; and it comprises a method of recovering pigments in fine dry commercial form, capable of direct incorporation into paint, varnish and ink vehicles from technical wet pastes, precipitates and magmas wherein a fine emulsion of a volatile oil such as naphtha is stirred into and incorporated with such a paste to give a uniform outer aqueous phase and bring the inner phases together and the mixture is then filter-pressed, washed and dried by a current of air thereby removing the interstitial moisture and permitting the particles to dry without wet contact; the method being particularly useful in making dry pigments of commercial quality from wet preparations of the copper phthalocyanine class; all as more fully hereinafter set forth and as claimed.

Pigments made in the wet way include pigment dyestuffs and lake pigments obtained by precipitation of dyestuff solutions; often on a mineral base or carrier. Precipitation may be with acids, salts, soaps, etc., or by dilution and any of a wide variety of carriers may be employed. In some cases the ratio of mineral matter to organic matter is large.

While the chemical compositions, the reactions involved and the methods of production differ widely with these wet pigments, in all cases the technical product manufactured is a thick paste, magma or precipitate; an aqueous suspension of pigmentary particles; particles spaced and isolated by intervening aqueous liquid. The aqueous phase contains dissolved salines and soluble byproducts. In the pastes, when freshly made, the suspended pigmentary particles are not only fine but are uniform in size and tint.

In making dry, commercial pigments which can be incorporated into ink, paint and varnish vehicles, it is quite general practice to press, wash and dry the wet paste, regrinding the dried material to secure pigmentary fineness. The particles are not then the same as those existing in the original paste. The drying of the wet paste in the ordinary way and the grinding operations disturb the pigment particles and the texture of the final product. In this operation there is an added grinding cost and the ground material is not always a satisfactory, even-tinted soft product readily blended with oils and the like. Crusted desiccates are hard grinding and the result is often a harsh off-color powder. In drying, the wet particles in contact stick together and there is a tendency in all cases for the production of hard clods or agglomerates of leathery or horny character.

Grinding is usually in micro-pulverizers or the like; rotary hammer impact devices. Sometimes ball mills are used. By prolonged grinding the powder may be made fine enough for use, though the particle size range is undesirably great. To prepare ink or paint from the powder ordinarily requires a second grinding or working in the presence of the vehicle (e. g. linseed oil), in a paint mill. With conventionally produced pigment powders of harsh texture this second grinding requires a great expenditure of time and energy. Some pigments require as much as five days grinding in a paint mill, to produce a satisfactory dispersion. The action of this second grinding is not strictly a reduction of particle size; nevertheless considerable mechanical effort is required to work the pigment into the vehicle.

The difficulty in incorporating pigments which have been dried and ground in the conventional way, into oily paint vehicles, may be due in part to the fact that the particles are very thoroughly aerated; each particle has a strong adsorbed film of air and the pores are filled with air. At any rate the agglomerated or aggregated particles are often very hard to wet with oil.

In another and prior invention (Patent 2,138,049), I have described and claimed a method of going directly from wet pigments to fine dry pigments capable of direct use in making paints, inks and varnishes and retaining the original particles of the wet paste. In this method the wet pigment is pressed and washed in the usual way and is then converted into a slurry with water. Into this slurry is incorporated a certain amount of a volatile oily liquid of the character of naphtha, incorporation being by an emulsifying agitation. With the right amount of naphtha the material can be dried in a current of warm air, the air first taking off the interstitial water. Oily liquids of the character of naphtha, toluene, etc., are adsorbed by the particles and held against early evaporation. In drying such a mixture in pans there is a first free evolution of water and later an evolution of naphtha vapor.

Dry pigments produced in this manner are uniform tinted, soft and blend readily with oily vehicles without the necessity for heavy grinding in paint mills. The dried material coming from the pans breaks down readily into a very fine powder; a powder in which the particles are of the same order of magnitude as those in the wet paste.

I have now discovered that for some purposes and with some pigment batches there is substantial advantage in altering the order of steps; first emulsifying the water and volatile oil together and then admixing with a wet pigment paste to make a slurry going to the drier. The emulsion is made of any desired degree of fineness, using any desired emulsifier. It is ordinarily best to have the droplets of oil of about the same order of magnitude as the pigment particles.

Operating in this manner the oil emulsion may be added to the pigment batch at any time; it is not necessary to await the production of a washed presscake. It may be added to a batch of freshly made pigment prior to any washing or thickening. After washing the pigment may be slurried and dried, giving a soft desiccate. The level even tint of a well made pigment batch is preserved.

Utilization of this principle in making pigments of commercial quality is particularly valuable with pigments of the phthalocyanine class. As chemical substances they have brilliant colors, are fast and have many other valuable properties. But none of the products of the many methods of manufacture known are directly useful as pigments. As dry materials, however fine they may be ground, they give nothing but harsh powders, markedly off color and not readily blending with linseed oil and the other vehicles used in ink, paint and varnish. It is therefore the practice with most of these products to produce subdivision as a wet dispersion by bringing the phthalocyanine into solution in concentrated sulfuric acid and then reprecipitating by dilution with water. Ice is often used. This gives an extremely fine dispersion but the dispersion is in sulfuric acid. It is possible to get rid of the sulfuric acid and convert the dispersion into an aqueous wet paste, and such a wet paste is a commercial material. It is, however, extremely difficult to dry the wet paste without clumping and lumping and with the production of a dry powder of pigmentary character.

But as I have found, working under the present invention, if an aqueous emulsion of a volatile oily body of the character of naphtha is stirred into such an aqueous paste the resulting mixture can be pressed, washed if necessary and dried without forfeiting the original fineness of character. This is done in the present invention: a phthalocyanine paste is mixed with an aqueous emulsion of naphtha, etc., and the slurry dried in pans in a current of air. The interstitial moisture between the particles disappears first and the wet particles do not cling together. A phthalocyanine is recovered as a material in which the original very fine subdivision still exists. The dry powder blends readily with oily vehicles.

The achieved object in the present invention, not only in making phthalocyanine pigments but others, is, so to speak, to oil the individual pigment particles, with the non-aqueous volatile liquid. The emulsion as prepared contains the naphtha, etc., together with fine pigment, as the internal or dispersed phase and water as the external or enveloping phase. An important thing is to disperse the naphtha, etc., into very fine droplets, in preparing the emulsion; droplets as small as the pigment particles. Then each pigment particle becomes a sort of nucleus for attachment of an enveloping film of naphtha. A suitable dispersing agent is useful in making the emulsion. If the emulsion added is too coarse-grained, there tends to be coalescence of pigment particles into clumps which is not desirable.

The emulsion is added to the wet pigment with agitation, to form a complex multi-phase dispersion. Agitation is continued for a length of time, varying with the different pigments, usually under a condition making the emulsion break, with adsorption of naphtha on the individual pigment particles. The pH of the mixture is controlled during incorporation of the emulsion, to a value high enough to prevent premature breaking of the emulsion but low enough to permit gradual breaking of the emulsion after a suitable time. The optimum pH is more or less empirical, and depends on the type of pigment paste treated, and the results desired. However, it is readily determined for any given pigment. With some colors, the pigmentary properties of the finished pigment are affected by the pH maintained during the incorporation of the emulsion.

The proportion of immiscible liquid to pigment (dry basis) is controlled within limits varying with different types of pigments but readily determinable for any given pigment. The ratio of immiscible liquid to pigment is not very critical. Enough liquid is provided to insure "oiling" every pigment particle, but extreme excess is avoided in order to prevent flushing or shedding: a sudden separation of most of the water which takes place when immiscible solvents, oils, etc., are added in large amount to aqueous pigment dispersions.

It is often advantageous to admix the volatile-oil emulsion with the pigment paste as soon as possible; to add it before the particles tend to coarsen by internal actions. Indeed it is sometimes advantageous to perform the pigment-producing preparation in the presence of the dispersed oil droplets to make a coprecipitation, so to speak, of pigment particles and the fine suspended volatile oil.

Usually the emulsion breaks in the course of stirring without any additional precautions being taken, but in some cases it is desirable to induce breaking of the emulsion in any of various ways, the simplest being by addition of common salt or the equivalent to the mixture. Polyvalent metal salts (e. g. $MgCl_2$, soluble aluminum and calcium salts, and soluble salts of heavy metals such as lead and barium) are also useful emulsion breaking agents for my purposes. Breaking of the emulsion can be induced by adjusting the pH, usually to a lower value, in any convenient way. Sometimes simple dilution with water suffices. In some cases application of heat aids in breaking of the emulsion.

There is no very marked change in appearance of the mixture corresponding to the breaking of the emulsion though there is a viscosity change, but there is a considerable difference in results depending on whether this action is complete or not. In practice the minimum stirring time to produce the desired results is determined by test for the pigment to be dried, and in operation stirring is prolonged for a while beyond this time, to insure completion of the desired actions.

After the emulsion has broken as described the pigment-water-naphtha mixture is filter-pressed in the ordinary way. All the added water, most of the dispersing agent and some of the naphtha go off in the filtrate. The presscake is then thoroughly washed and dried in pans in the usual way, in an oven with circulating warm air currents. The cake dries rapidly and completely to a fine uniform powder, or to soft lumps which break down to a powder at a touch.

The fact that all or most of the dispersing agent is removed from the pigment before drying, and does not appear in the final product (unless this is deliberately provided for), makes possible a wide choice in dispersing agents to secure the best results with the various classes of pigments. And by the same token there can be employed a considerable excess of dispersing agent beyond that which would be tolerable in the finished pigment.

In pressing the admixture of emulsion and paste there is the important advantage that what is put in the ovens is a relatively firm and concentrated cake, which has already had most of the original water squeezed out. The exposure to air and heat is minimized; in fact it is shorter even than in the conventional pigment drying processes.

Usually, as stated, I add the emulsion to the freshly produced aqueous pigment slurry before filtering and washing. In some cases the emulsion can be added directly to a hot slurry. Sometimes, as when a pigment requires especially prolonged washing to free it of soluble reaction byproducts, it is better to filter and wash the pigment, then slurry the washed pigment and incorporate the emulsion therein, followed by a second filtering and washing operation to get rid of the bulk of the emulsion components.

A wide variety of surface active agents (dispersing and emulsifying agents) can be employed in my process.

Producing the desired association of emulsified volatile oil with pigmentary surfaces offers no difficulty in most cases. But with pigment pastes of the lake type wherein the percentage of mineral matter is quite large, it is sometimes worth while to use special dispersing agents; generally those of somewhat alkaline type.

The following examples are illustrative of typical and good specific embodiments of the invention. The first two examples illustrate the species of the invention wherein a pigment produced in the usual way is filtered and washed, and the washed cake is re-slurried with water prior to incorporation of the emulsion. In the last four examples, the emulsion is incorporated directly into the freshly produced aqueous pigment.

*Example 1.*—This example illustrates the application of the process to copper phthalocyanine blue pigment (Monastrol or Heliogen Blue); a type of pigment regarded in the art as difficult to prepare in dry powder form with preservation of anything like the brilliancy and uniform particle size of the freshly produced aqueous pigment.

Commercial wet preparations of copper phthalocyanine blue vary considerably. In some cases it is desirable to run the material through a colloid mill as a preliminary step. A 5880 pound batch of washed copper phthalocyanine pigment press cake prepared in the usual commercial way (see below) and having a solid content of 17 per cent by weight was diluted with 4420 pounds water to form a 10 per cent suspension. The thin liquid suspension was run through a wet pulverizing apparatus or colloid mill to break up clots, lumps, etc. Thence it went to a vat, wherein it was diluted with 10,000 pounds water to a 5 per cent dispersion of smooth and uniform character.

The pH was adjusted to 7 (neutrality) by a suitable addition of ammonia, and the temperature adjusted to 37° C.

An emulsion was prepared by dissolving 50 pounds of a surface-active agent of the sulfonated-esters-of-dicarboxylic-acids type (Aerosol OT) in 500 pounds of a volatile narrow boiling point range petroleum solvent of the gasoline or petroleum naphtha type (Apco thinner), and admixing with 1000 pounds water containing 50 pounds of a commercial surface-active agent of the soluble pine oil type; a preparation sold under the trade-mark Nopco 1440. The smooth emulsion thus produced was slowly incorporated in the pigment slurry, with stirring, over the course of one hour. The batch was stirred for 20 hours, then filter-pressed and washed thoroughly. The washed cake dried in pans at 60° C. without agitation in an oven of conventional type. The yield was 1000 pounds of an extremely soft product of high pigmentary value. If desired the stirring period can be shortened by adding salt to the mixture shortly after the incorporation of the emulsion is complete.

A material of particularly good pigmentary properties can be produced by admixing the pigment slurry with the emulsion, circulating the mixture through a colloid mill, adding salt to the mixture, filtering, washing and drying. Use of a colloid mill at any stage in the process is advantageous.

In making copper phthalocyanine blue pigments, one good way (British patent 464,673) involves bringing a mixture of urea and boric acid into reaction with a mixture of phthalic anhydride and cupric chloride, in the dry way with heating of the complex mixture until reaction is complete. The melt is then cooled, ground and washed with caustic soda solution and then with dilute HCl to eliminate reaction byproducts. Usually it is then redissolved in sulfuric acid and the solution poured into water, followed by filtering and washing. This wet washed product was the starting material in the above example. An advantage of my process is that in some cases the step of redissolution in sulfonic acid and precipitation by dilution can be omitted.

The above example shows how the invention gives good results with a type of pigment which, as stated, is generally considered very difficult to produce as a dry, uniform, brilliant powder.

*Example 2.*—The pigment to be dried was 3500 pounds of a washed press cake (12 per cent solid content) of deep toluidine maroon: the product formed by coupling metanitroparatoluidine and the metanitranilid of beta-hydroxy naphthoic acid (termed naphthol ASBS). The wet press cake was passed through an agitating apparatus to insure smoothing out of all clumps, lumps, etc., and was then diluted with 1500 gallons water in a tank. The temperature was adjusted to 35° C. and the pH adjusted to 9.0 (slightly alkaline).

An emulsion was prepared of 210 pounds of the volatile thinner of Example 1, and 420 pounds water with the aid of 56 pounds of a liquiform surface active agent sold under the trade name "Alkanol WX 15 per cent." The emulsion was added gradually over the course of an hour. The mixture was stirred for two hours more, and then dilute acetic acid was added very slowly with stirring until the pH fell to about 4.5. At this point the emulsion broke. Stirring was continued for 16 hours more, then the pigment was filter-pressed, washed thoroughly and dried in trays in an oven at 60° C.

The yield was 420 pounds of bright soft pigment of excellent pigmentary value.

*Example 3.*—A batch of 72 pounds Victoria pure blue BO dyestuff in 1500 gallons water was admixed with a quantity, 10 per cent in excess of the stoichiometrical amount, of a phosphotungstic acid solution adjusted to pH 3.6. Precipitation took place. The pH of the reaction mixture after precipitation was 4.5. The watery mixture containing the precipitated pigment, excess phosphotungstic acid and other reaction byproducts was warmed to 60° C. and there was slowly incorporated with stirring, during the course of one hour, an emulsion of 138 pounds of a narrow boiling point range volatile petroleum fraction (Apco thinner) in 275 pounds water and containing 2.75 pounds of an emulsifying agent of the di-glycol oleate type (Emulphor A Oil Soluble).

The emulsion was soon observed to break. Stirring was continued for four hours more and then the batch was filtered in a filter-press, washed free of solubles and dried in pans in an oven at 57° C.

The yield was 138 pounds of toner in a dry, soft fluffy condition and of outstanding brilliance.

*Example 4.*—A batch of dark para toner was prepared by diazotizing 108 pounds of para nitraniline and admixing with a suitable coupling solution comprising inter alia 107 pounds beta-naphthol and 10 pounds mono-sulfonic F acid. When coupling was complete, the pH of the aqueous reaction mixture was adjusted to 9.5. The volume of the aqueous reaction mixture was 500 gallons. Some 600 pounds of common salt were sprinkled in with stirring until the salt dissolved. The mixture then had a pH of about 9.2.

An emulsion was prepared comprising 222 pounds of a narrow boiling range volatile thinner of the naphtha type and 444 pounds water, using 3.75 pounds of oleic acid and 3.75 pounds triethanolamine as emulsifying agents. The emulsion was gradually added to the aqueous reaction mixture, with stirring, over the course of an hour. Stirring was continued for 24 hours, and the mixture was then filtered and the filter cake washed with water until free of chlorides, and dried without agitation in pans at 93° C. The dry product was a soft brilliant powder.

The salt was added to expedite the adsorption of the thinner upon the pigment. The process can be carried out without addition of salt, by employing a longer stirring time.

*Example 5.*—In preparing medium toluidine maroon, metanitroparatoluidine (72 pounds) was coupled in the usual manner with 149 pounds of the ortho-toluidid of beta-hydroxy naphthoic acid (termed naphthol ASD in the art) in alkaline solution, and the pH of the mixture brought to pH 9.

An aqueous emulsion of petroleum naphtha was prepared, comprising 56.25 pounds naphtha, 112.5 pounds water and 4.5 pounds of a di-glycol oleate type emulsifying agent (Emulphor Oil Soluble A). The emulsion was added to the reaction mixture at room temperature, over the course of 2 hours. The batch was stirred for 16 hours more and then filter-pressed, washed thoroughly to free it of chlorides, placed on trays and dried in an oven at 82° C. The yield was 220 pounds of extremely bright, soft, fluffy powder.

*Example 6.*—A batch of 126 pounds of the sulfate of dichlorbenzidene was treated in a known way with the aid of a suitable mineral acid to prepare a tetrazo solution, which was coupled at 10° C. with aceto-acet-orthotoluidid, 210 pounds, suspended in water and containing sufficient sodium acetate as a buffer so that when coupling was complete the reaction mixture had a pH of about 4.5. The reaction mixture contained 336 pounds of insoluble yellow toner, as a fine aqueous suspension. An emulsion was prepared by emulsifying 32 pounds of Apco thinner, 60 pounds water and 8 pounds of the sodium salt of the dioctyl ester of sulfo-succinic acid. The emulsion was added to the pigment mixture over the course of an hour, with stirring. The emulsion broke quickly, due to the low pH maintained. The batch was then filter-pressed, washed thoroughly and dried at 60° C. in pans in an oven. The dry product was a soft brilliant yellow tone powder.

Water-immiscible volatile organic liquids of the gasoline type, as featured in most of the above examples, work well in my process and are reasonable in cost. Petroleum naphthas are suitable for almost all the usual pigments. Many other such liquids can be employed with good results, among these being benzene, toluol, Stoddard's solvent, the water-insoluble higher aliphatic alcohols such as n-butyl alcohol. Halogenated hydrocarbons exemplified by trichlorethylene, ethylene dichloride and carbon tetrachloride have the advantage of reducing or obviating fire hazard and can be used alone or in admixture with inflammable solvents. A small amount of nitrobenzene or chlorbenzene in conjunction with petroleum naphtha type solvents is sometimes useful in securing special color effects. Turpentine, xylol and terpenes and pinenes are useful. Mixtures of two or more solvents can be employed. Hydrogenated aromatic carbons are especially useful since they can be employed in relatively small proportions; say 10 to 30 per cent by weight on the pigment. Of course, Tetralin (tetrahydronaphthalene), Decalin (decahydronaphthalene) and cyclohexane are especially suitable. It is usually desirable to employ a volatile solvent free of "heavy ends": greasy residua of low volatility which would remain with the pigment. However, sometimes, though not very often, a greasy pigment is desired. The "gummy ends" of turpentine can be employed in preparing the emulsion in certain cases.

The nature of the emulsified liquid is not critical; it may be almost any one of what are known commercially as "water-immiscible volatile solvents," provided it can be emulsified in water to a fine dispersion and is sufficiently volatile to be dried off the pigment after removal of the water. Its chemical nature is not important although of course liquids should be avoided having any solvent power for the pigment.

As stated, a wide variety of surface-active agents can be used in preparing the emulsion in my process. Again, the particular surface-active agent is not critical although there may be advantage in one over another for a particular volatile liquid and for a particular pigment paste. The particular agent or agents selected depends partly on the pigment to be dried and partly on the character of the volatile immiscible liquid. In general I employ agents of the type adapted to produce oil-in-water emulsions, under the conditions obtained in the process. Among suitable agents are those of the water-soluble soap type (sodium oleate, sodium naphthenate, etc.) various stearates, resinates and ricinoleates; soluble oils (terpene oils, sulfonated oils); various organic sulfates, sulfonates and sulfate half-esters such as sodium tetrahydronaphthalene sulfate; complex sulfates and esters of high-molecular-weight alcohols, acids and lactones; various gums; various derivatives of sulfonated higher alcohols; lecithin and other phosphatides; and inorganic agents such as certain soluble silicates and phosphates. In many cases, for some reason, slightly better results are obtained by employing two different surface-active agents in preparing the emulsion; one being dissolved in the water and the other in the volatile oil prior to admixing these. The agent dissolved in the volatile oil is preferentially oil wettable and that dissolved in the water is preferentially water wettable. Example 1 above illustrates an embodiment of the invention involving utilization of two surface-active agents in preparing the emulsion.

A list of commercial surface-active agents appears in the Journal of Industrial & Engineering Chemistry, Vol. 31, No. 1, January 1939, pages 66 to 69.

Certain surface-active agents are put on the market in liquid form containing substantial amounts of free solvent. This can be allowed for in making up the emulsion.

Sometimes it is desired to have the finished dry pigment powder contain small amounts of various additional substances, to make the powder water-repellent or for other special requirements. The present process lends itself very readily to incorporation of these agents, as they can simply be dissolved or dispersed in the solvent or in the emulsion, and appear in the finished pigment uniformly distributed in the particles. Among the addition agents which can be incorporated in this way are rosin and resins, driers, mineral oils, insoluble soaps such as Al and Ca stearates (for water-proofing), casein, glue, dextrine or sugar (for making water-base paints), and various dispersing agents in addition to those used in preparing the emulsion, cetyl alcohol waxes for carbon paper pigments, wool grease, naphthenic acids, fatty acids, hydrogenated castor oil wax and pine wood fatty acids. With some of these, e. g. aluminum stearates, a gel is obtained but the gel breaks down on stirring in with the pigment.

While the invention has been described in connection with drying pigments it can also be utilized in drying other particles where a fluffy, uniform powder is desired.

Copper phthalocyanine pigment produced by the present invention is a novel material and commercially advantageous. Copper phthalocyanine produced in all the known ways is a brilliant blue preparation which, however, cannot be comminuted to give a soft pigment preparation. The same is true of dried pastes: they comminute to a harsh powder often off-color. Under the present invention a soft pigmentary powder is produced having a true blue color, of uniform particle size.

What I claim is:

1. In the direct conversion of level toned, uniform, wet pigmentary magmas, precipitates and pastes into a dry pigment without loss of the uniformity and level tone, the method which comprises mixing an emulsion with such a wet pigmentary paste, said emulsion being an intimate dispersion in water of a non-aqueous liquid vo'atile under drying conditions, emulsion being aided by the presence of a surface active agent, breaking the emulsion to release said non-aqueous liquid in contact with the pigment particles and drying the pigment by evaporation and removal of the water and the non-aqueous liquid.

2. In the conversion of fine-grained, wet phthalocyanine pastes directly into fine-grained dry pigments, the process which comprises admixing such a paste with an intimate aqueous emulsion of a non-aqueous liquid volatile at pigment drying temperatures, said emulsion containing a surface active agent, breaking the emulsion to form a slurry and drying the slurry with evaporation of water and the volatile liquid.

3. The process of claim 1 wherein the pigmentary paste is mixed with the aqueous emulsion prior to washing and other treatments disturbing the texture, the emulsion is caused to break and the mixture is thereafter filtered, washed and purified and is then dried.

4. The method of claim 1 wherein an emulsion breaking agent is added to the emulsion-pigment mixture to cause breaking of the emulsion.

5. The method of claim 1 wherein the non-aqueous liquid is a volatile petroleum hydrocarbon.

6. In drying fine-grained wet phthalocyanine pigments the improvement which comprises forming an intimate aqueous emulsion of the pigment with an emulsion in water of a non-aqueous liquid volatile at pigment drying temperatures and containing a surface-active agent, breaking the emulsion, filtering and drying with evaporation of the non-aqueous liquid and water, whereby a soft, fluffy pulveriform product results on drying.

7. A method of drying aqueous pigments with production of a soft, fine pigment powder, which comprises dispersing a water-immiscible readily vo'atile liquid in water with the aid of a surface active agent incorporated therein, to produce a fine-grained emulsion, incorporating the emulsion with an aqueous pigment and causing the emulsion to break with coalescence of the immiscible liquid on the pigment particles, removing excess water from the pigment mechanically and drying the pigment in air with evaporation of the volatile liquid.

8. A process of converting wet copper phthalocyanine pigment pastes into a fine dry pulverulent pigment capab'e of direct incorporation into paint and varnish vehicles, which comprises admixing the wet paste with an intimate aqueous emulsion of a water-immiscible liquid volatile at pigment drying temperatures and a surface active agent, causing the emulsion to break and thereafter drying the mixture with evaporation and removal of water and of the immiscible liquid.

VINCENT C. VESCE.